June 15, 1926. 1,588,673
E. R. GINGRICH
GLARESHIELD
Filed Jan. 3, 1925    2 Sheets-Sheet 1
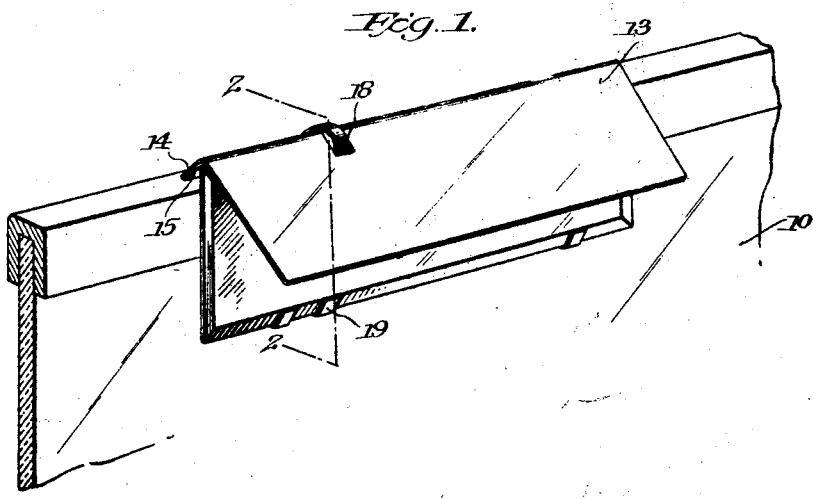
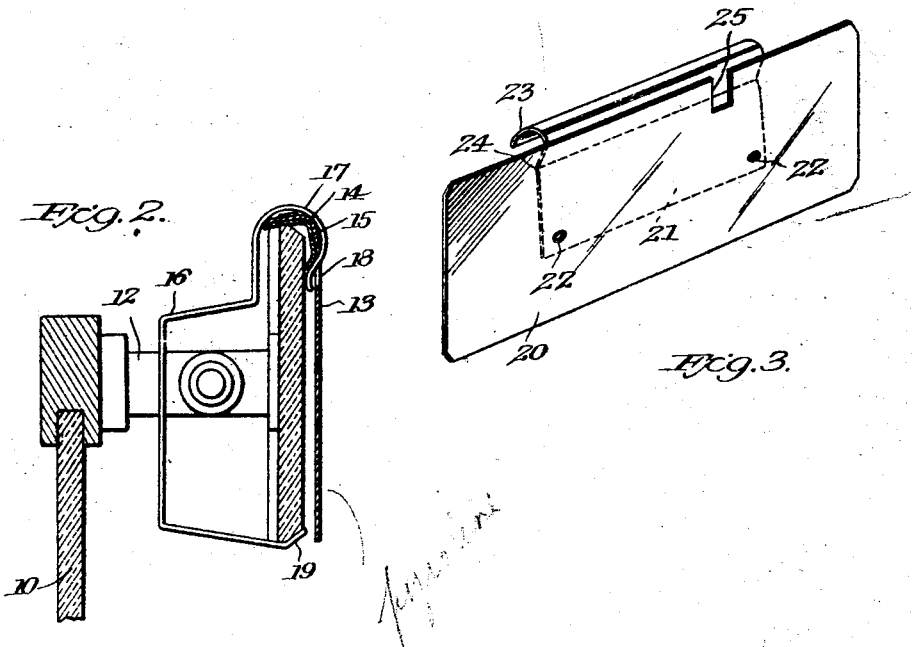
Inventor
Elmer R. Gingrich

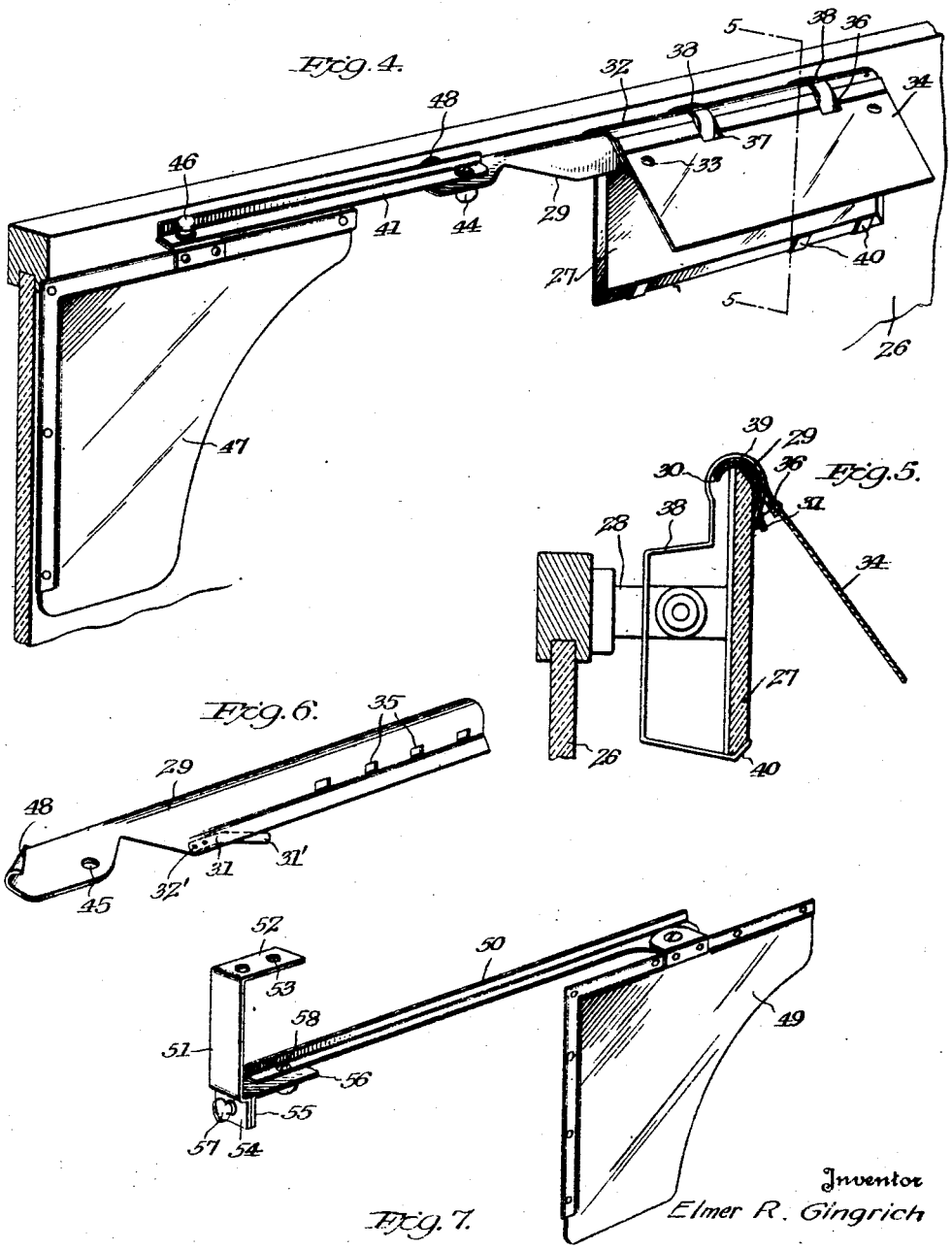

Patented June 15, 1926.

1,588,673

UNITED STATES PATENT OFFICE.

ELMER R. GINGRICH, OF LANCASTER, PENNSYLVANIA.

GLARESHIELD.

Application filed January 3, 1925. Serial No. 382.

This invention relates to improvements in glare shields for vehicles, and more particularly to an attachment adapted to be connected to a rear view mirror for absorbing the rays of light reflected therefrom by the headlights of machines approaching from the rear.

It is customary to provide automobiles with rear view mirrors positioned within the car and mounted adjacent the top of the windshield just above the level of the driver's eyes so that he may have a clear view of rearwardly approaching traffic.

When driving at night, headlights of vehicles approaching from the rear reflect from the rear view mirror into the driver's eyes, which is liable to cause him to lose control of the machine and result in serious injury, both to the occupants of the car and the machine itself.

A primary object of the present invention is to provide a glare shield attachment so constructed that when not desired to be used, it may be moved to such a position as not to interfere with the use of the mirror, and, when driving at night, may be moved in front of the mirror so as to absorb the rays of light reflected therefrom.

A further object of the invention consists in constructing the glare shield attachment so that it will have the dual function of being adapted to both absorb the rays of light reflected from the mirror and also shield the eyes of the driver against the dazzling headlights of a machine approaching in the opposite direction.

Referring to the drawings:

Figure 1 is a perspective view showing the glare shield in the inoperative position attached to the rear view mirror of a vehicle.

Figure 2 is a sectional view taken substantially along the lines 2—2 of Figure 1, showing the shield moved to the operative position.

Figure 3 is a perspective view of a modified form of glare shield.

Figure 4 is a perspective view of a modified form of the invention.

Figure 5 is a sectional view taken substantially along the line 5—5 of Figure 4.

Figure 6 is a detailed view of the supporting arm.

Figure 7 is a perspective view of a further modification.

Referring to the drawings in which like numerals indicate like parts in the several views, 10 denotes the windshield of a motor vehicle which has secured thereto a rear view mirror 11 by means of the clamping bracket 12 of any conventional type. The mirror is positioned to the right of the driver so as to enable him to readily see traffic approaching from the rear, and is sufficiently spaced from the windshield to permit a wiper to be attached to the windshield without interfering with the operation thereof.

In order to prevent the rays of light of machines approaching from the rear from reflecting into the eyes of the driver from the mirror, a colored translucent glare shield 13, preferably composed of pyraline, and of any desired shape or size, is mounted on the upper edge of the mirror 11 in such a manner that when not desired for use, it may be positioned from in front of the mirror, while when driving at night and it is desired to prevent the rays of light of machines approaching from the rear from reflecting from the mirror into the eyes of the operator, the shield may be conveniently moved down so as to cover the front of the mirror. Preferably, the shield 13 is provided with a curved edge 14, to which is secured a correspondingly formed metallic reinforcing member 15 which engages the adjacent edge of the mirror 11 and permits the shield to be rocked or moved relative to the mirror to any desired position.

The shield 13, while loosely connected to the mirror, is maintained in fixed position thereon, preferably by a spring clip 16 having its upper end substantially hook-shaped, as at 17, and arranged to extend through an opening 18 in the shield 13 so as to contact with the front face of the mirror in the particular manner, as shown in Figure 2. The opposite end of the clip 16 terminates in an upwardly extending lip 19, which yieldably engages the lower edge of the mirror, and may be readily removed therefrom upon the application of sufficient pressure. The opening 18 in the shield is preferably offset from the center thereof so as not to conflict with the connection of the bracket 12 with the rear of the mirror.

The modified form of glare shield shown in Figure 3 distinguishes from that previously described, in that the shield 20 is connected to the mirrors by means of the metallic supporting member 21 which is secured to the rear face of the shield adjacent its lower edge by any suitable means, such as the eyelets 22. The supporting member 21 terminates at its opposite edge in a rearwardly and downwardly curved hook portion 23 which loosely engages the adjacent edge of the mirror. A longitudinally extending rib 24 formed in the supporting member adjacent the hook 21 contacts with the face of the mirror when the shield is mounted thereon so as to assist in maintaining the shield in position. The shield is adjustably secured to the mirror by a spring clip which extends through the opening 25 formed in the shield, in substantially the same manner as the spring clip 16 previously described.

The operation of the device is as follows:

Assuming the driver of the machine desires to prevent the rays of headlights of rearwardly approaching machines from being reflected from the mirror into his eyes, he will move the glare shield 13 from the position shown in Figure 1 to that shown in Figure 2, which will tend to absorb the rays of light reflected from the mirror. As the shield is loosely mounted on the edge of the mirror, and since the spring clip yieldably maintains the shield in fixed position, it will be seen that the mirror will maintain any position it may be placed in without the requirement of additional securing means. Should it be necessary to remove the shield from the mirror, the same can be readily effected by disengaging the lower end of the clip 16 from the mirror.

Referring to the modified form of the invention shown in Figure 4, a glare shield attachment is connected to the rear view mirror in such a manner as to accomplish the dual function of providing means for both absorbing the rays of light reflected from the mirror, and also preventing the headlights of machines approaching in an opposite direction from annoying the driver. It will be observed that in this construction the windshield 26 has the rear view mirror 27 secured thereto in any suitable manner, such as by the bracket 28. A metallic supporting member 29 terminates at one end in a rearwardly and downwardly curved portion 30, which is adapted to be mounted on the adjacent edge of the mirror 27. The opposite extremity of the supporting member has an outwardly flared end 31 so formed as to engage the outer face of the mirror and yieldably maintain the supporting member 29 thereon. A metallic member 32, substantially of the same shape as the supporting member 29 is carried by the latter and has secured thereto, by the eyelets 33, the colored glare shield 34. The supporting member 29 has a series of longitudinally spaced openings 35 which are arranged to register with similarly formed openings 36 and 37 in the glare shield. The spring clip members 38, preferably of the form previously described, have their upper hooked ends 39 extending through the openings 35, 36 and 37, and engage the outer face of the mirror, as clearly shown in Figure 5, while the opposite extremity of the clips are detachably connected to the lower edge of the mirror, as at 40. The glare shield 34, by reason of the loose connection of the curved member 32 with the adjacent surface of the support 29 may be moved relative to the mirror 27, and is maintained in any predetermined position by the hook portions 39 of the clips 38.

An arm 41 is adjustably connected at one end to the adjacent end of the supporting member 29 by any suitable means, such as the thumb nut 44, which extends through openings 45 formed in the supporting member 29 and the arm 41.

The opposite end of the arm 41 has movably connected thereto, by the thumb nuts 46, a colored glare shield 47, preferably made of pyraline and of any suitable configuration. The arm 41 is limited in its swinging movement relative to the supporting member 29 by a stop 48, while the shield 47 may be set in any desired position relative to the glare shield 26 by the adjusting of the thumb nuts 44 and 46.

It will be seen that by reason of this construction the glare extinguisher 47 may be adjusted laterally with respect to the mirror 27 by the engagement of the spring clips 36 and 37 with any of the openings 35 in the supporting member 29.

Normally, the glare shield 47 is positioned parallel to the windshield 26 and is of sufficient distance therefrom as to permit access to the windshield for cleaning or other purposes. The shield 47 may be swung to any desired position and maintained therein by the thumb nuts 44 and 46.

The glare shield 47, when not in use, can be moved to one side, so as not to obstruct the line of vision of the driver, or if preferable, both the shields 34 and 37 may be moved out of view by swinging the support 29 about its axis on the mirror 27 so that the shields will be turned to a position adjacent the top of the vehicle. A spring clip or finger 31' (Fig. 6) secured in any suitable manner, such as by the rivets 32', to the under side of the flared end 31, may be provided to engage the top edge of the mirror when the shields are moved to the inoperative position. The spring clip 31' being to one side of the mirror 27, does not normally engage the same, but upon the support being moved laterally relative to the mirror and turned about its axis, it will be so positioned as to engage the top edge of the mirror and thus assist in yieldably maintaining the shields adjacent to the top of the vehicle. When it is desired to move the shields to operative position, the support 29 can be grasped and first moved laterally to disengage the clip 31' from the mirror and then turn through an angle of about 90°, whereupon the shields will be moved to a position substantially parallel with the windshield and mirror.

In the form of the invention illustrated in Figure 7, the glare shield 49 and the supporting arm 50, instead of being connected to a rear view mirror, is arranged to be attached to the top or any other convenient part of the vehicle body, by means of a bracket 51, which has its upper end terminating in a laterally bent portion 52, having openings 53 therein for receiving screws or other suitable retaining means that secure the bracket to the top of the vehicle. The opposite extremity 54 of the bracket, preferably is slightly offset and is connected to a depending flange 55 on the plate 56 by a thumb nut 57, while the adjacent end of the arm 50 is adjustably connected to the plate 56 by the set screw 58.

It is to be understood that the several forms of the invention herewith shown and described are merely illustrative and in no sense restrictive, and that such changes and modifications may be made as fall within the purview of one skilled in the art without departing from the spirit of the invention and the scope of the appended claims.

I claim:

1. The combination with a rear view mirror for vehicles, of a glare shield having its upper edge movably contacting with and along the adjacent edge of the mirror, and clamping means engaging said shield and the lower portion of the mirror and adapted to maintain the shield by reason of its frictional contact therewith in different positions relative to the mirror.

2. The combination with a rear view mirror for vehicles, of a glare shield having its upper edge terminating in a curved portion adapted to be movably mounted on the adjacent edge of the mirror, and yieldable clamping means engaging said shield and the lower portion of the mirror to maintain the shield in different positions relative to the mirror.

3. The combination with a rear view mirror for vehicles, of a glare shield having its upper edge terminating in a downwardly curved portion adapted to be mounted on the adjacent edge of the mirror, and yieldable clamping means detachably engaging said shield and the lower portion of the mirror and adapted to maintain the shield in fixed and predetermined positions relative to the mirror.

4. The combination with a rear view mirror for vehicles, of a glare shield having its upper edge terminating in a downwardly curved portion adapted to be mounted on the adjacent edge of the mirror, said shield having a recess therein, and yieldable means extending through said recess for detachably connecting said shield to said mirror.

5. The combination with a rear view mirror for vehicles, of a glare shield having a curved member positioned adjacent one edge thereof, said member adapted to engage the upper edge of said mirror, and yieldable means engaging said member and adjustably connecting said shield to said mirror.

6. The combination with a rear view mirror for vehicles, of a glare shield having a recess therein, a curved member connected to said shield and adapted to engage the upper edge of the mirror, and yieldable means extending through said recess and adjustably connecting said member and said shield to said mirror.

7. The combination with a rear view mirror for vehicles, of a glare shield, a curved member connected to one side of said shield and adapted to be mounted on said mirror, an opening in said shield adjacent said curved member, and a spring clip having one end extending through said opening and contacting with the mirror and its opposite extremity engaging said mirror.

8. The combination with a rear view mirror for vehicles, of a glare shield, a curved member connected to one side of said shield and adapted to be mounted on said mirror, an opening in said shield adjacent said curved member, a spring clip having one end extending through said opening and contacting with the mirror and its opposite extremity engaging said mirror, and means for maintaining said shield in a predetermined position relative to said mirror.

In testimony whereof I have hereunto set my hand.

ELMER R. GINGRICH.